United States Patent
Weber et al.

(10) Patent No.: US 6,317,332 B1
(45) Date of Patent: Nov. 13, 2001

(54) ELECTRONIC MODULE FOR AN ELECTRIC MOTOR OPERATED DRIVE UNIT

(75) Inventors: Matthias Weber, Baden-Baden; Norbert Knab, Appenweier; Walter Haussecker, Buehlertal; Klaus Voehringer, Malsch; Guenther Riehl; Martin Hager, both of Buehlertal, all of (DE); Klaus Roth, Hermanville-sur-Mer (FR); Jochen Benz, Sontheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/402,566

(22) PCT Filed: Dec. 17, 1998

(86) PCT No.: PCT/DE98/03719

§ 371 Date: Jan. 10, 2000

§ 102(e) Date: Jan. 10, 2000

(87) PCT Pub. No.: WO99/40285

PCT Pub. Date: Aug. 12, 1999

(30) Foreign Application Priority Data

Feb. 5, 1998 (DE) .............................. 198 04 490
Nov. 9, 1998 (DE) .............................. 198 51 455

(51) Int. Cl.$^7$ .................................................. H05K 7/02
(52) U.S. Cl. ........................ 361/760; 310/71; 439/76.1
(58) Field of Search ...................... 310/71, 68, 89, 310/80; 318/443, 15; 361/785, 752, 728, 736, 760; 439/76.1

(56) References Cited

U.S. PATENT DOCUMENTS

| | | | |
|---|---|---|---|
| 5,528,093 | | 6/1996 | Adam et al. .......................... 310/89 |
| 5,770,902 | * | 6/1998 | Batten et al. .......................... 310/71 |
| 5,777,410 | * | 7/1998 | Asakura et al. ....................... 310/71 |
| 5,984,695 | * | 11/1999 | Riehl et al. .......................... 439/76.1 |
| 6,107,713 | * | 8/2000 | Hulsmann et al. ..................... 310/75 |

FOREIGN PATENT DOCUMENTS

| | | |
|---|---|---|
| 42 25 496 | 2/1994 | (DE) . |
| 197 46 518 | 4/1999 | (DE) . |
| 0 538 495 | 4/1993 | (EP) . |

* cited by examiner

Primary Examiner—Tulsidas Patel
(74) Attorney, Agent, or Firm—Kenyon & Kenyon

(57) ABSTRACT

In order to reduce assembly cost for attaching the electronic module and to realize better protection of the circuit board in an electronic module for an electric motor operated drive unit, in particular, for an electric motor operated automobile window opener, including an electronic housing part, which can be attached to the housing of the drive unit, with a connector piece arranged thereon and a circuit board inserted in a mounting means the electronic housing part and having electric and/or electronic components, which circuit board is electrically connected to contact elements of the connector piece and to power leads fastened to the electronic housing part, with the power leads being provided with contact sections projecting from the electronic housing part, it is suggested that the electronic housing part be configured as a separate housing which has a housing interior which can be closed with a cover; that the circuit board be arranged completely in the housing interior; and that a second connector piece be arranged on the electronic housing part through which at least the contact sections of the power lead are brought out of the electronic housing part.

22 Claims, 8 Drawing Sheets

ELECTRONIC MODULE FOR AN ELECTRIC MOTOR OPERATED DRIVE UNIT

BACKGROUND OF THE INVENTION

The present invention relates to an electronic module for an electric motor operated drive unit.

BACKGROUND INFORMATION

An electronic module of this type is described, for example, in German Patent Application No. 1 97 46 518. The electronic module has an open electronic housing part, configured as a plug-in module, with a connector and a mounting means for a circuit board. A circuit board inserted in the mounting means is electrically connected to contact elements of the connector and to power leads for connecting to the motor. In fastening the plug-in module on the housing of the drive unit, a section of the circuit board which projects out from the plug-in module is introduced into the housing of the drive unit so that as it is being inserted a Hall sensor arranged on this section comes into the proximity of a ring magnet arranged on the armature shaft of the drive unit motor. At the same time, contact sections of the power leads extending from the module contact correspondingly configured contacts of the geared motor of the drive unit. With a fully inserted module, a sealing ring provided on the electronic housing part is pressed against the housing of the drive unit, forming a housing closed on all sides. A drawback is that the electronic housing part of the module is not delimited from the gear housing and motor housing of the drive unit. Particles or dirt and moisture present in the housing of the drive unit therefore quickly reach the electric and electronic components of the circuit board, making special protective measures necessary such as, for example, costly double-sided lacquering of the circuit board. A further drawback is that when the electronic module is removed, the circuit board and all electrical component are freely accessible and therefore are not protected from damage. In addition, a costly adjustment is necessary to align the circuit board carrying the Hall sensor with respect to the armature shaft of the motor.

SUMMARY OF THE INVENTION

The drawbacks present in the related art are avoided by the electronic module according to the present invention. Double-sided lacquering of the circuit board is not necessary, since the circuit board is arranged in a separate housing part which can be closed with a cover, so that the sensitive electronic components of the circuit board are situated in the electronic housing part protected from dirt and dampness. The power leads are brought out of the electronic housing part via a second connector piece. When the electronic housing part is fastened to the housing of the drive unit, the second connector piece is introduced through a correspondingly configured opening into the housing of the drive unit so that the contact sections of the power leads projecting from the electronic housing part make contact with motor contacts arranged in the housing of the drive unit. Assembly cost for fastening the electronic module on the housing of the drive unit is advantageously reduced as a result of the separate electronic housing part. Costly adjustment and alignment of the circuit board with respect to the motor armature shaft become unnecessary. The electronic module can advantageously be utilized in various types of electric motor operated drive units.

Electric connection leads of components which are positioned in the vicinity of the armature shaft of the motor and which must be electrically connected to the circuit board, for example, such as parts of an electronic control or regulating system, can be advantageously provided in the second connector piece. It is especially advantageous for the second connector piece to be configured in the shape of a plug and the component, which, for example, can be a Hall IC component, is arranged on the end of the plug-shaped connector piece projecting from the electronic housing part. Upon insertion of the second connector piece into the housing of a drive unit, the Hall IC component is then automatically pushed into the desired end position. The electronic housing part can, for example, be manufactured of plastic in one piece with the first and the second connector pieces in one manufacturing step as an injection molded part.

The second connector piece can, however, also be produced from insulating material as a separate piece and arranged on the electronic housing part after its fabrication. Thus it is possible, for example, to partially embed power leads and connection leads in an insulating material with two end sections facing each other and subsequently to electrically connect a Hall IC component at one end section of the second connector piece to the bare connection surfaces of the connecting leads, for example, via bond wires, and then to cover the Hall IC component with a sealing compound which at the same time insulates and protects it from environmental influences. After this, the separately produced second connector piece can be arranged on the electronic housing part. In so doing, it is advantageous that different techniques or materials can be used for the manufacture of the second connector piece than for the manufacture of the rest of the electronic housing part and that the Hall IC component is completely embedded in insulating material and as a result is protected from harmful environmental influences. For example, the second connector piece can be produced as a stamped-grid part which is extrusion-coated with insulation material or as a 3D-MID component (molded interconnection device).

It is also advantageous for a pressure compensation channel to be provided in the second connector piece. A tightly closed electronic housing part makes a pressure compensation element useful. Since the housings of the drive units already have such a pressure compensation element, the latter can also be advantageously used for the electronic housing via the pressure compensation channel.

In another exemplary embodiment, the Hall sensor element is arranged on the circuit board in the electronic housing. Magnetic flux conductors which measure the variable magnetic field of a magnet rotating on the armature shaft of the motor and conduct it to the Hall sensor element can then be advantageously arranged in the second connector piece.

It is also advantageous to bring the circuit-board-side connection sections of the contact elements of the first connector piece, of the power leads, and of the additional electric connection leads parallel to each other through contact openings of the circuit board. The circuit board can then be plugged into the connection sections by hand during assembly. If the circuit board is arranged in the interior of the housing directly across from the cover, the connection sections can be advantageously soldered to the connection sections with the cover off using the cost-effective dip-soldering process.

It is furthermore particularly advantageous for a relay used for control of the motor of the drive unit to be arranged in the electronic housing so that the relay connections can be passed through contact openings of the circuit board parallel to the other connection sections. As a result of this, the circuit board can be cost-effectively equipped exclusively with SMD components before being mounted in the electronic module. The relay which is to be connected to the circuit board can be pre-assembled in the electronic housing part and is soldered along with the other connection contacts only after insertion of the circuit board into the slot of the electronic module. In this way an additional manufacturing step is saved.

DETAILED DESCRIPTION

Figure 1:
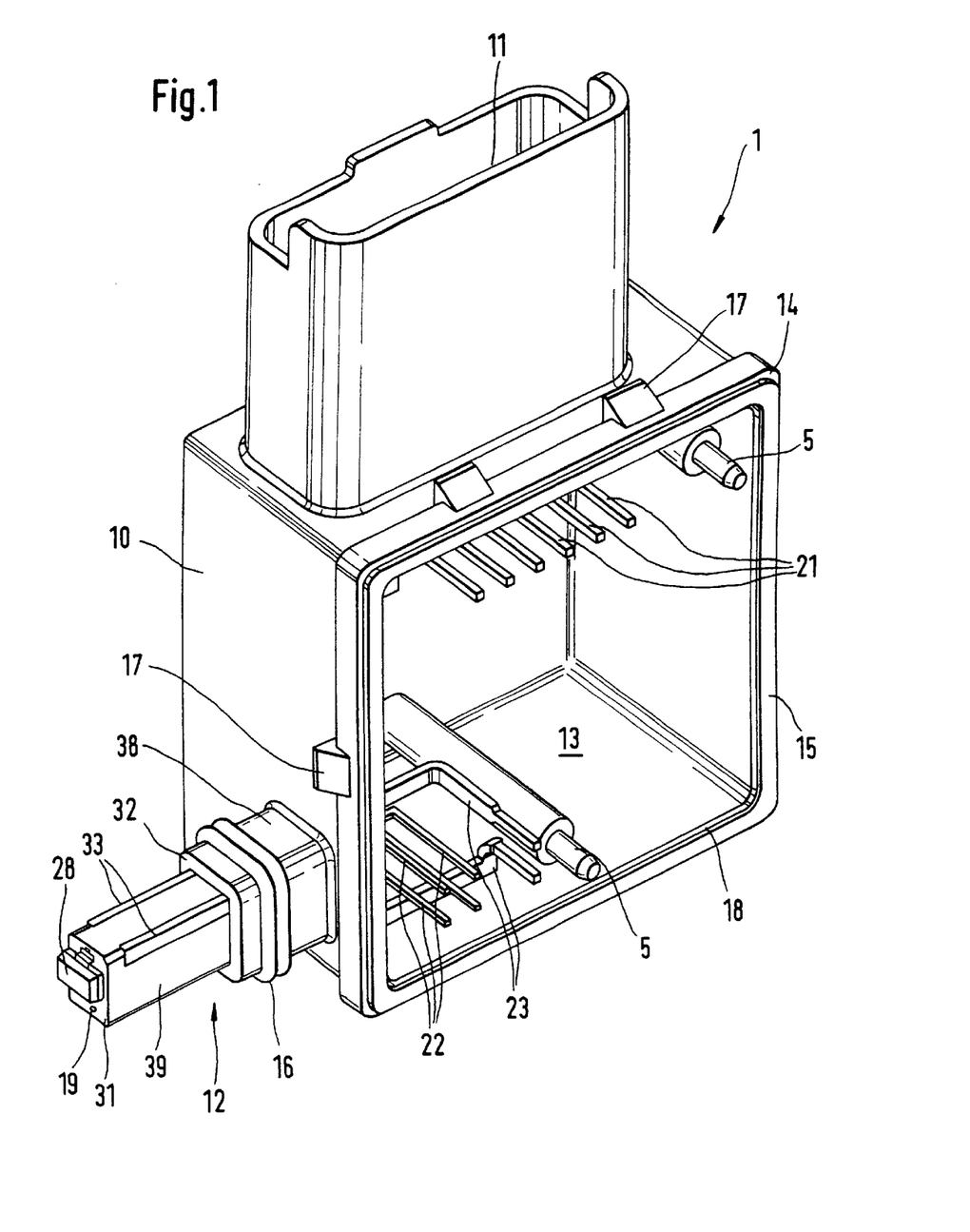
FIG. 1 shows an electronic module according to the present invention without a cover, without a circuit board and without a relay.
Figure 2:
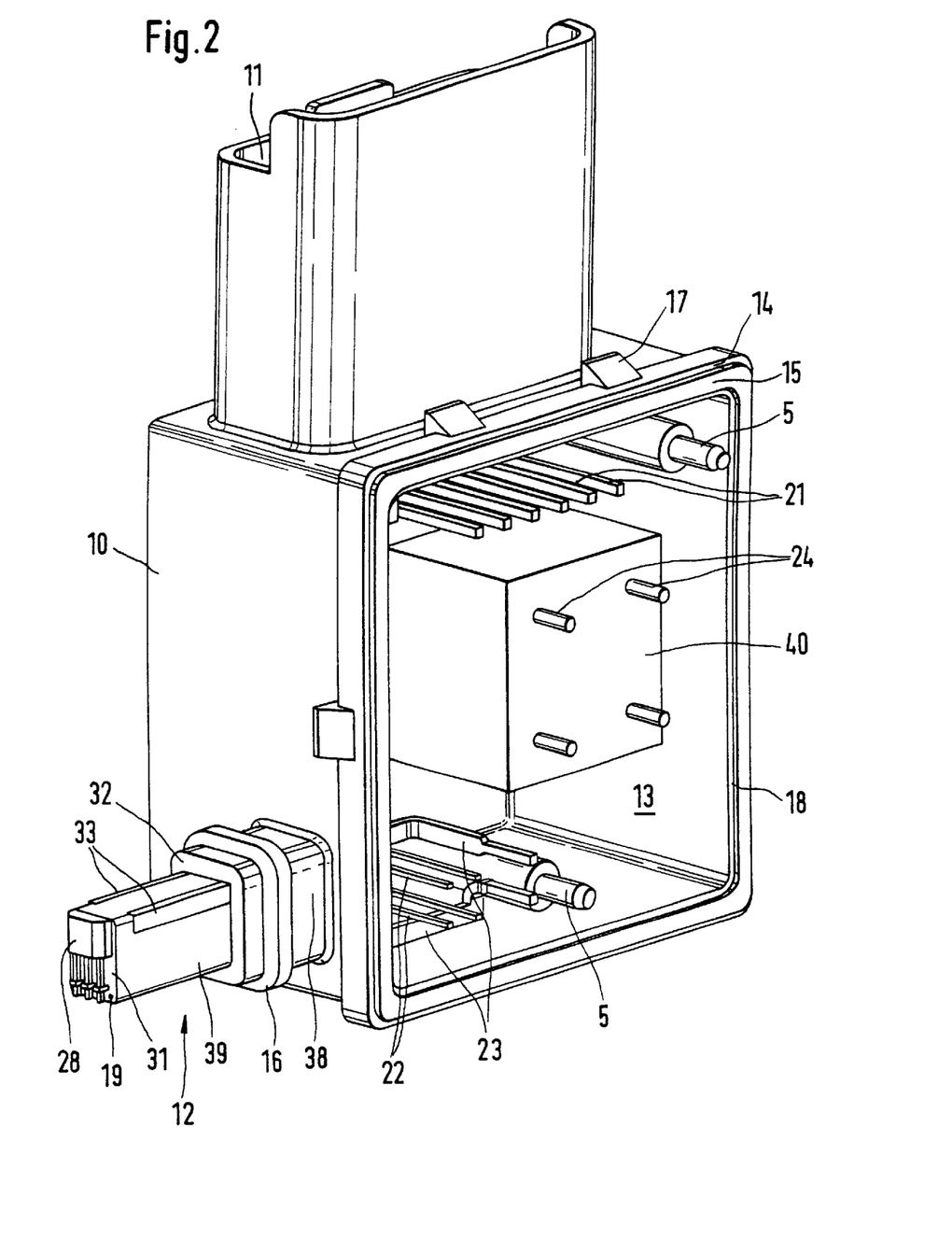
FIG. 2 shows the electronic module without the cover, without the circuit board and with the relay.
Figure 3:
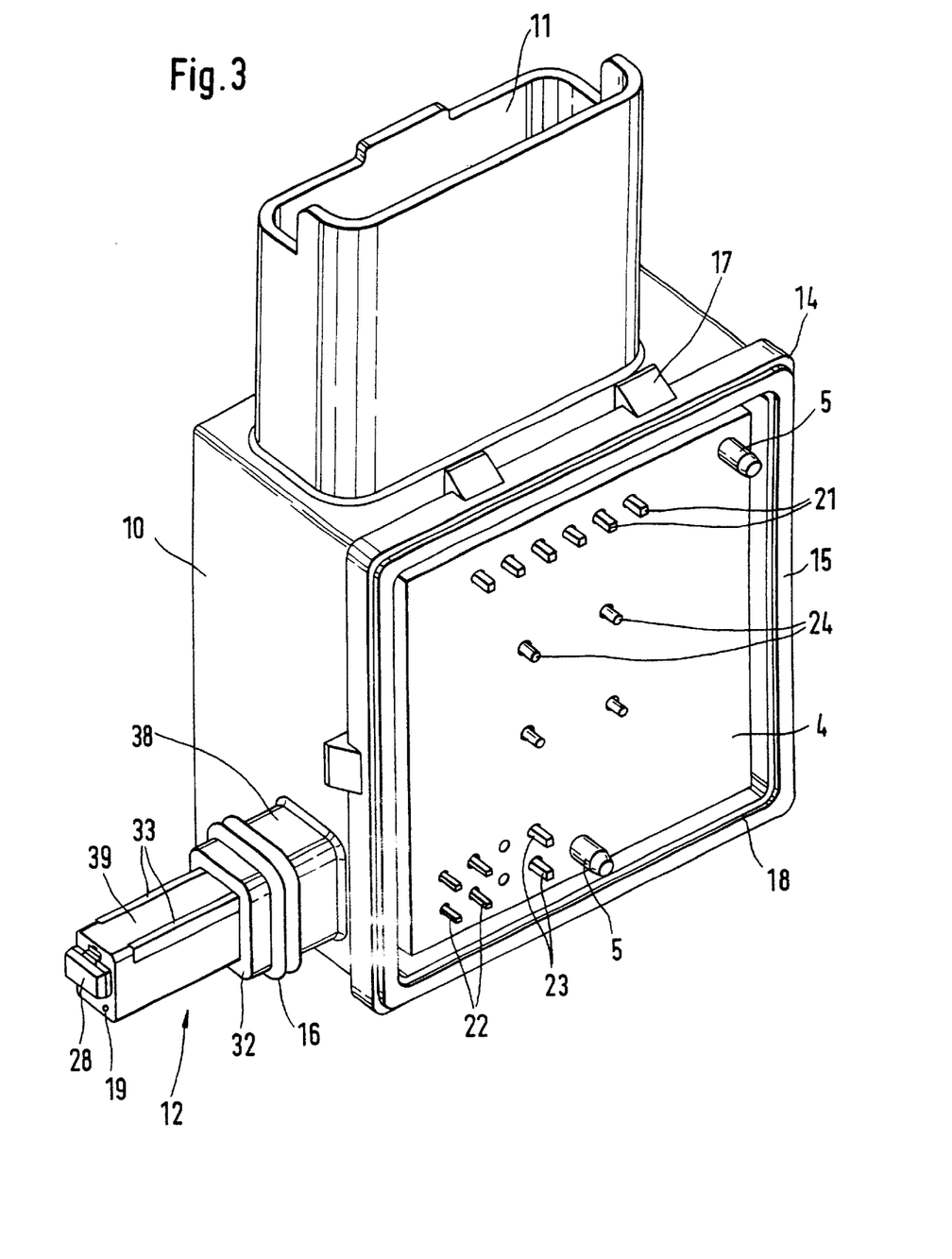
FIG. 3 shows the electronic module without the cover, with the circuit board and with the relay.
Figure 4:
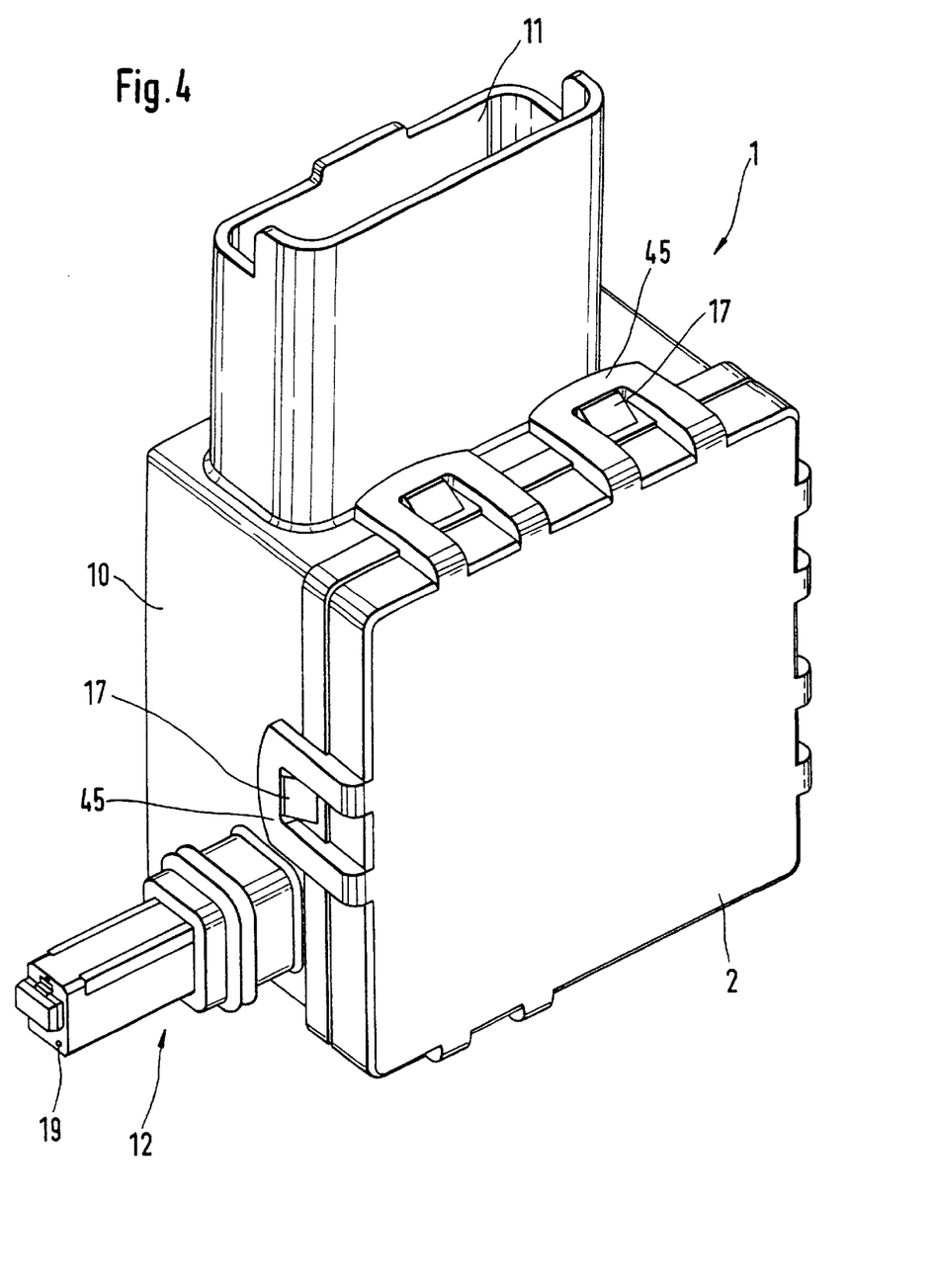
FIG. 4 shows the electronic module closed with the cover.

As depicted in FIG. 1, electronic module 1 includes a box-shaped electronic housing part 10 with a bottom, four side walls, and an opening 18 bordered by the side walls, through which opening the interior 13 of the electronic housing part 10 is accessible. The opening is delimited by an encircling seat 14 for a housing cover 2 which can be fastened on lugs 17 projecting outward from the side walls. To make it possible for housing 10 to be tightly closed with cover 2, seat 14 has an encircling sealing ring 15. Furthermore, electronic housing part 10 has a first connector piece 11 on one side wall and a second connector piece 12 projecting outward on a second side wall. In this first exemplary embodiment, connector pieces 11, 12 are fabricated of plastic as one piece together with electronic housing part 10 as an injection molded part. First connector piece 11 is provided for connection of an external control cable and has contact elements 21 which are partially injected into housing part 10. As can be seen in FIG. 1, second connector piece 12 has two power leads 23 and in addition four electric connection leads 22 which are likewise partially injected into second connector piece 12 and have bare connection sections which project into housing interior 13. As can be further seen in FIG. 1, the connection sections of power leads 23 which project into housing interior 13, connection leads 22, and contact elements 21 are bent in the direction of opening 18 of electronic housing part 10 so that all connection sections are aligned parallel to each other in the interior of the housing. In housing interior 13, two plugs 5 are provided which are oriented parallel with the connection sections and serve as a mounting means for circuit board 4. As depicted in FIG. 2, a relay 40 can be inserted during assembly of the electronic module into electronic housing part 10 and fastened therein so that relay terminals 24 extend parallel to the other connection sections 21, 22, 23 and to plugs 5 in the direction of opening 18. A circuit board 4 with components which are not depicted is inserted through opening 18 into electronic housing part 10. Prior to this, SMD components are mounted on circuit board 4 on one side, and the circuit board has contact openings, for example, in the form of through-plated holes. During placement into electronic housing part 10, circuit board 4 is slipped onto the plug 5 as shown in FIG. 3. At the same time, the connection sections of contact elements 21, connection leads 22, power leads 23, and relay connections 24 are brought through the contact openings of the circuit board, after which they are soldered in one operation to the circuit board using the dip solder process, for example. An additional processing step for fastening the relay to the circuit board after SMD soldering and before installation of the circuit board is thus not necessary. As shown in FIG. 4, electronic housing part 10 is closed with a cover 2 after the dip soldering operation. Cover 2 has several elastically resilient, projection straps 45 around its perimeter as locking means which lock with lugs 17 when cover 2 is placed onto the seating area 14. As this occurs, elastic sealing ring 15 is clamped between cover 2 and seating area 14 so that opening 18 of electronic housing part 10 is tightly closed and circuit board 4 is arranged fully protected in electronic housing part 10.

In this first exemplar embodiment, second connector piece 12 projecting from the exterior of electronics housing part 10 has a plug-like form with a rectangular cross section. Connector piece 12 has a base 38 projecting from housing 10 which bears an encircling sealing ring 16, from which base a cuboid-shaped end section 39 projects via a stepped edge 32. As can be seen in FIG. 1, power leads 23 are fully surrounded in base 38 with plastic. Contact sections 33 of power leads 23 emerge from base 38 at stepped edge 32 and lie against two edges of end section 39 so as to be freely available for contact. In addition, embedded in connector piece 12 are four electric connection leads 22 which are conductively connected to a Hall IC module 28 which is arranged on end 31 of plug piece 12 projecting from the housing. A pressure compensation channel 19 extends from projecting end 31 into the housing interior 13.

Figure 5:
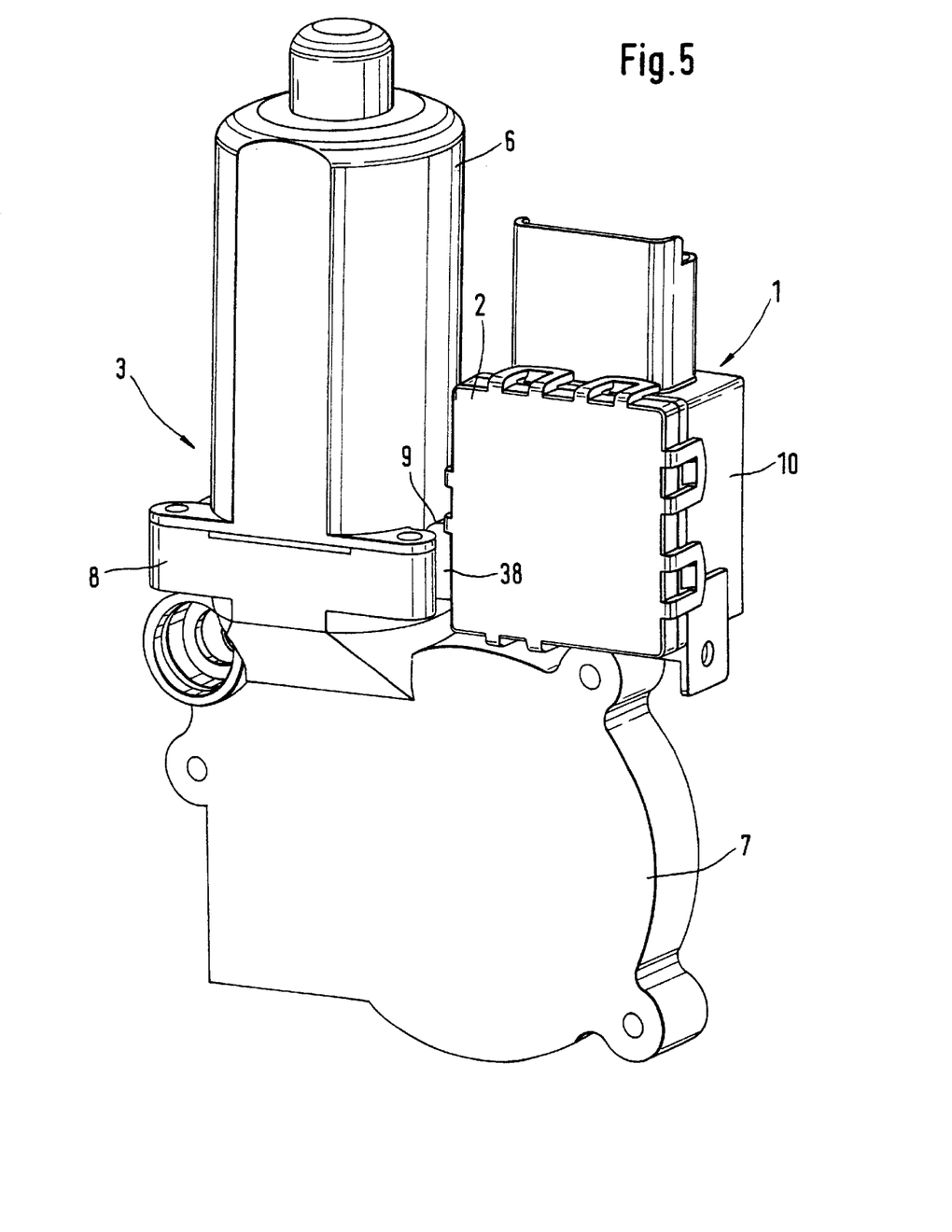
FIG. 5 shows the electronic module coupled to a drive unit according to the present invention.
Figure 6:
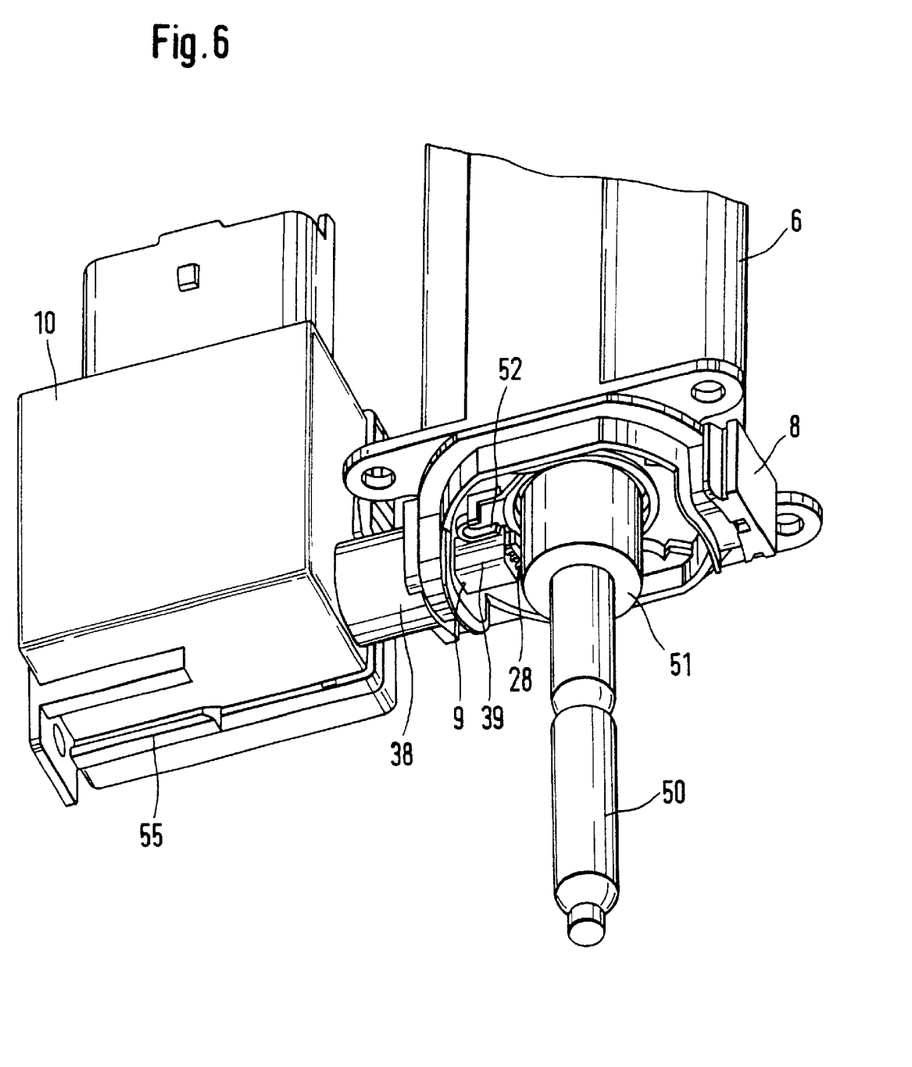
FIG. 6 shows a partial perspective view of the electronic module and a portion of the drive unit.

In FIGS. 5 and 6, drive unit 3 of a window opener with commutator motor and electronic module 1 fastened thereto is depicted. The drive unit 3 includes a motor housing part 6, a brush part 8, and a gear housing 7. Electronic housing part 10 is pushed onto gear housing 7 via two T-grooves 55 on its underside, with second connector piece 12 being introduced into the housing of drive unit 3 through an opening 9 in brush part 8. As can best be seen in FIG. 6, a motor armature shaft 50 of the geared motor projects out from motor housing 6 through brush part 8 into gear space 7. In brush part 8 there are a brush holder 53, motor contacts 52 of the electric motor, and a ring magnet 51 borne on motor armature shaft 50. When electronic module 1 is pushed onto housing 3 of the drive unit, second connector piece 12 together with end section 39 penetrates into opening 9, with stepped edge 32 limiting the penetration depth of the connector piece so that Hall IC module 28 comes into the proximity of ring magnet 51 and elastically flexible end sections of motor contacts 52 make contact with contact sections 33 of power lead 23 with spring pre-stress. With fully seated module 1, sealing ring 16 closes opening 9. Housing interior 13 of electronic module 1 is connected to housing interior of the drive unit 3 through pressure compensation channel 19.

In operation, Hall IC module 28 measures the variable magnetic field of rotating ring magnets 51 and conducts a signal, which is dependent upon the change in the magnetic field, across connecting leads 22 of the control circuit arranged on circuit board 4. Conversely, the control circuit of circuit board 4 controls the current supply of the electric motor across power leads 23 and motor contacts 52 via relay 40.

In contrast to the exemplary embodiment depicted in FIGS. 1 through 6, it is of course also possible to solder relay 40 initially on circuit board 4 and then to insert the circuit board with installed relay into housing 10 of the electronic module.

It is furthermore provided in another exemplary embodiment that the Hall sensor element is fastened not on electronic housing part but rather in the housing of the drive unit, for example, in the brush holder. As the electronic module is pushed on, the contact sections of the connection leads, projecting from the second connector piece of the module, make contact with corresponding contacts of the Hall sensor element which is fastened in the housing of the drive unit.

In another exemplary embodiment it is provided that the Hall sensor element be arranged on circuit board 4. In this exemplary embodiment, second connector piece 12 in place of electric contact leads 22 has magnet flux leads which are partially injected in the second connector piece and which have projecting end sections on the circuit board side and the motor side. The magnet flux leads are composed of soft magnetic material with a high permeability. The contours of the motor-side end sections are adapted to the ring magnet and are separated from it by a narrow air gap. The circuit board-side end sections of the magnet flux leads end in the proximity to the Hall IC component on the circuit board so that the latter measures the magnet field induced in the magnetic circuit formed from ring magnet, air gap, magnetic flux leads and Hall-IC.

Figure 7:
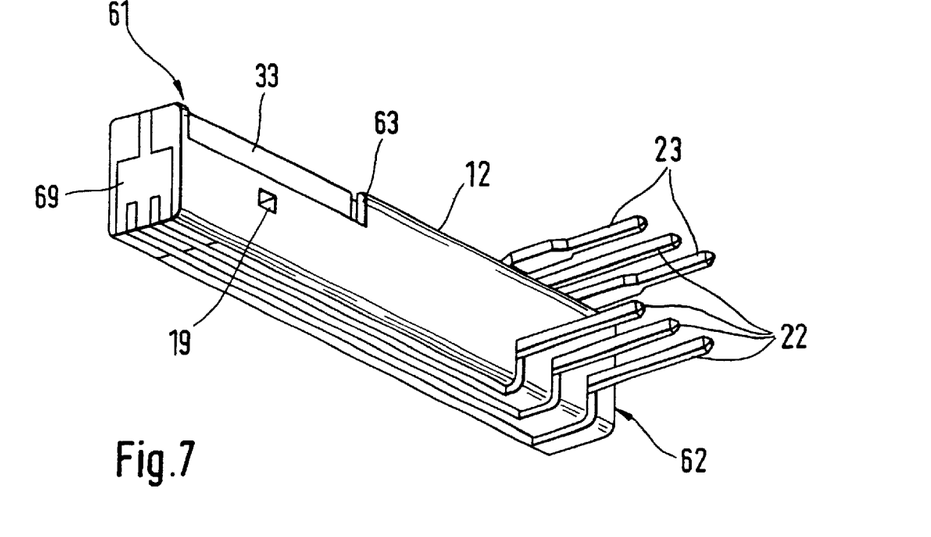
FIG. 7 shows a perspective view of the second connector piece according to the present invention as a separately fabricated part without a Hall IC component and without a sealing compound.
Figure 8:
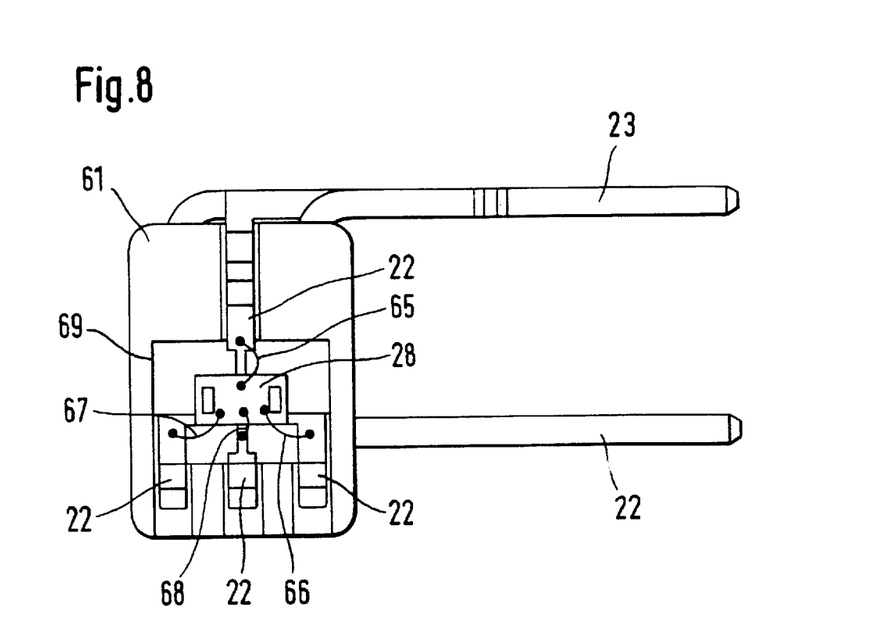
FIG. 8 shows a side view of a face of the second connector piece shown in FIG. 7 with the Hall IC component.
Figure 9:
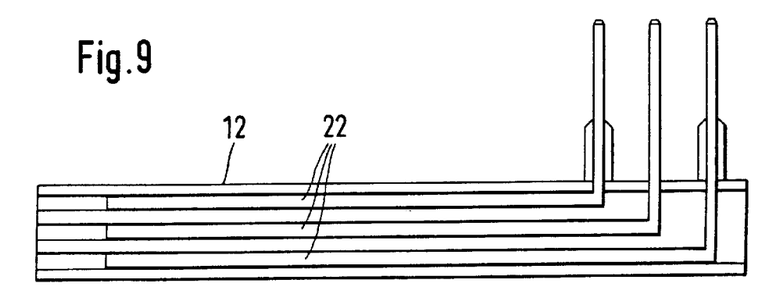
FIG. 9 shows a view from above of the second connector piece from FIG. 7.
Figure 10:
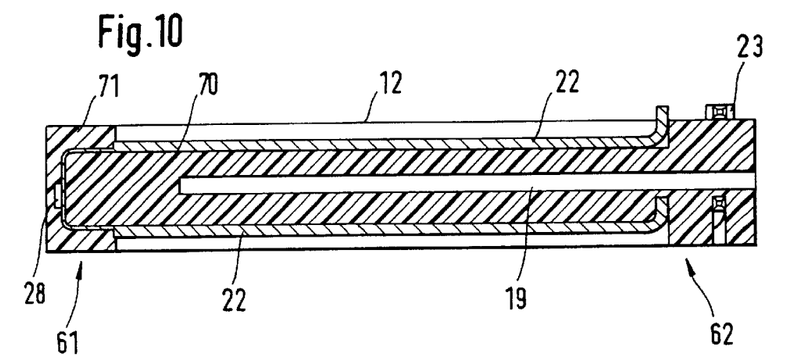
FIG. 10 shows a cross section through the second connector piece along a line A—A in FIG. 11 with the sealing compound applied to the Hall IC component.

In a further exemplary embodiment it is provided that second connector piece 12 be fabricated independently of electronic housing part 10. FIGS. 7 through 11 show a finger-like connector piece 12, which is fabricated as a separate part, with a first end section 61 and a second end section 62. Connector piece 12 is fabricated of insulating material and is provided with power leads 23 and connection leads 22. At second end section 62 of connector piece 12, connection sections of power leads 23 and connection leads 22 which are configured as connector pins extend out of the insulation material. Power leads 23 and connection leads 22 are brought into recesses of connector piece 12 from second end section 62 to the opposite first end section 61. At first end section 61, a recess 69 is formed on the face side of connector piece 12 for accommodating a Hall IC module 28, which is electrically connected via contact wires 65, 66, 67, 68 to connection leads 22. On first end section 61, which is provided with the Hall-IC module, an insulating sealing compound 71 is applied, as can best be seen in FIG. 10. The sealing compound, however, can also be applied at other places, in which case contact sections 33 of power leads 23 must remain accessible from the outside via openings 63 in the insulation. Hall IC component 28 is protected by the sealing compound or imbedding in insulation material from dirt, contamination, and, in particular, from carbon dust in the brush holder 8 of an electric motor operated drive unit. In addition, second connector piece 12, as can be seen in FIG. 7 and FIG. 10, has a pressure compensation channel 19 which extends from second end section 62 to a lateral opening in the vicinity of contact sections 33 of power leads 23.

Figure 11:
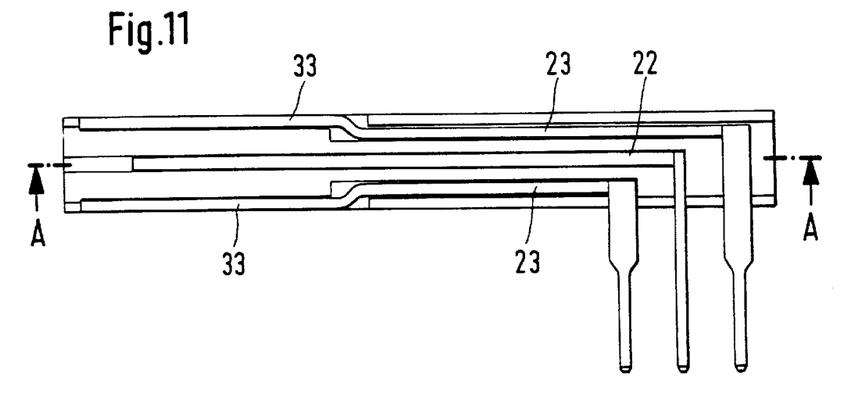
FIG. 11 shows a view from below of the second connector piece from FIG. 7.

Connector piece 12 can, for example, be produced by producing a preliminary injection molded piece 70 of plastic with recesses in which power leads 23 and connection leads 22 are inserted as stamped metal parts. The Hall IC module is inserted in recess 69 on first end section 61 of the connector piece and is electrically connected to connection leads 22 via connector wires 65, 66, 67, and 68 or in another suitable manner. Following this, sealing compound 71 or mold compound is applied on preliminary injection molded piece 70, with at least contact sections 33 of power leads 23 and connector pin-like connection sections of power leads 23 and connection leads 22 being left bare. It is also possible to first solder the Hall IC component onto a stamped grid which is made up of metal strips which are bonded to each other through connecting webs, and afterwards to extrusion coat, for example the stamped grid with plastic so that the Hall IC component is embedded in plastic. The connecting webs can then be separated through openings in the plastic in a conventional manner, thereby creating power leads and connection leads which are electrically insulated from each other. It is also possible to produce second connector piece as a 3-D MID component (3-D molded interconnection device). For this purpose, an injected, three-dimensional plastic basic part is provided with printed board conductors applied by plating, which form the power leads and connection leads. subsaquently, a Hall IC component 28 is bonded to the connection leads and insulating mold compound 71 is applied to base part 70.

Second connector piece 12 can be inserted into an injection molding tool after its production and extrusion coated with the electronic housing part 10. It is also possible, however, for second connector piece 12 to be inserted in an opening of a side wall of electronic housing part 10 and glued or fastened with locking means to the side wall. Connector piece 12 is arranged on electronic housing part 10 so that second end section 62 faces housing interior 13 and second end section 61 with the Hall IC component projects outward from electronic housing part 10. Similarly as in the case of the exemplary embodiment in FIG. 1, connector piece 12 can also be provided with a stepped edge or an encircling groove in which a sealing ring is inserted.

What is claimed is:

1. An electronic module for a drive unit operated with an electric motor, comprising:

a cover;

an electronic housing part being attachable to a housing of the drive unit, the electronic housing part being configured as a separate housing relative to the housing of the drive unit and having a housing interior, the housing interior being closed with the cover;

a first connector piece coupled to the electronic housing part, the first connector piece including contact elements;

a second connector piece coupled to the electronic housing part, the second connector piece including power leads, the power leads being attached to the electronic housing part and being provided with contact sections projecting from the electronic housing part, the contact sections being brought out from the electronic housing part via the second connector piece; and a circuit board coupled to the electronic housing part via mounting means of the electronic housing part, the circuit board including at least one of an electric component and an electronic component, the circuit board being disposed completely within the housing interior and being in electrical contact with the contact elements and the power leads.

2. The electronic module according to claim 1, wherein the drive unit is used in conjunction with an electromotive window lift of a motor vehicle.

3. The electronic module according to claim 1, wherein the second connector piece includes electric connection leads coupled to at least one of an electric component and an electronic component, the at least one of the electric component and the electronic component being disposed outside of the housing interior.

4. The electronic module according to claim 1, wherein the second connector piece includes a magnetic flux lead.

5. The electronic module according to claim 1, wherein the second connector piece is configured as a plug projecting from the electronic housing part and is integral with the electronic housing part, the second connector piece including electric connection leads, the electronic module further comprising:

a Hall sensor element having electrical connections, the Hall sensor element being disposed on an end of the second connector piece, the end being directed away from the electronic housing part, the electrical connections being in electrical contact with the circuit board via the electric connection leads.

6. The electronic module according to claim 5, wherein the Hall sensor element is a Hall IC component.

7. The electronic module according to claim 5, wherein the electronic housing part is produced as an injection molded part, the first connector piece and the second connector piece being injection molded and being injected into the injection molded part.

8. The electronic module according to claim 3, wherein the second connector piece is arranged on the electronic housing part, the second connector piece being produced independently of the electronic housing part, the second connector piece being produced as a separate part including an insulating material, the electric connection leads and the power leads being at least partially embedded in the insulating material, and wherein the at least one of the electric component and the electronic component includes at least one Hall sensor element, the at least one Hall sensor element being completely embedded in the insulating material.

9. The electronic module according to claim 8, wherein the at least one Hall sensor element is at least one Hall IC component.

10. The electronic module according to claim 8, wherein the second connector piece includes a first end section and a second end section, the second end section being disposed opposite to the first end section, the at least one Hall sensor element being disposed at the first end section and being in electrical contact with the electrical connection leads, the power leads and the electric connection leads being brought out of the insulating material at the second end section.

11. The electronic module according to claim 10, wherein the second connector piece is produced as an injection molded part, the injection molded part including an insulating material, and wherein the at least one Hall sensor element is covered with an insulating sealing compound.

12. The electronic module according to claim 10, wherein the insulating material provides openings, the openings being at least between the first end section and the second end section, contact sections of the power leads being accessible for electrical contacting from outside of the electronic module via the openings.

13. The electronic module according to claim 10, wherein connection sections of the power leads at the second end section and connection sections of the electric connection leads at the second end section are configured as connector pins projecting in one direction.

14. The electronic module according to claim 1, wherein the electronic housing part has a pressure compensation channel, the pressure compensation channel extending from the housing interior and through the second connector piece.

15. The electronic module according to claim 5, wherein circuit board-side connection sections of the contact elements, circuit board-side connection sections of the power leads and circuit board-side connection sections of the electric connection leads are brought parallel to each other through contact openings in the circuit board and are soldered to the circuit board.

16. The electronic module according to claim 15, further comprising:

an electromagnetic relay disposed in the electronic housing part, the electromagnetic relay including connections, the connections being brought parallel to the circuit board-side connection sections of the contact elements, the circuit board-side connection sections of the power leads and the circuit board-side connection sections of the electric connection leads, the connections being soldered to the circuit board.

17. The electronic module according to claim 15, wherein the circuit board is disposed directly opposite the cover.

18. The electronic module according to claim 15, wherein the circuit board-side connection sections of the contact elements, the circuit board-side connection sections of the power leads and the circuit board-side connection sections of the electric connection leads are soldered to the circuit board using a dip solder process.

19. The electronic module according to claim 1, wherein the electronic housing part includes an encircling sealing ring in a seating area, the seating area being capable of receiving the cover.

20. The electronic module according to claim 1, wherein the electronic housing part can be fastened to the housing of the drive unit, and wherein, using the second connector piece, the electronic housing part can be introduced into a correspondingly configured opening in the housing of the drive unit so that the power leads make contact with motor contacts of a geared motor, the motor contacts being disposed in the housing of the drive unit.

21. The electronic module according to claim 20, wherein the second connector piece includes an encircling seal ring on a peripheral surface of the sec and connector piece, the correspondingly configured opening being capable of being tightly closed using the encircling seal ring upon the fastening of the electronic housing part to the housing of the drive unit.

22. The electronic module according to claim 21, further comprising:

a Hall sensor element disposed on a projecting end of the second connector piece, wherein, when the electronic housing part is introduced into the correspondingly configured opening in the housing of the drive unit, the Hall sensor element measures a magnetic field of a ring magnet, the ring magnet being arranged on a motor armature shaft of the geared motor.

* * * * *